United States Patent
Cho et al.

(10) Patent No.: US 8,289,216 B2
(45) Date of Patent: Oct. 16, 2012

(54) ANTENNA-EMBEDDED CASE FOR MOBILE COMMUNICATIONS TERMINAL, METHOD OF MANUFACTURING THE SAME, AND MOBILE COMMUNICATIONS TERMINAL

(75) Inventors: Sung Eun Cho, Gyunggi-do (KR); Jae Gyu Go, Gyunggi-do (KR); Yong Shik Na, Gyunggi-do (KR); Dae Kyu Lee, Gyunggi-do (KR); Chan Gwang An, Gyunggi-do (KR); Hyun Kil Nam, Seoul (KR); Byung Hwa Lee, Gyunggi-do (KR); Dae Seong Jeon, Gyunggi-do (KR); Ha Ryong Hong, Gyunggi-do (KR); Jae Suk Sung, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 395 days.

(21) Appl. No.: 12/608,874

(22) Filed: Oct. 29, 2009

(65) Prior Publication Data

US 2010/0220028 A1  Sep. 2, 2010

(30) Foreign Application Priority Data

Feb. 27, 2009 (KR) .................. 10-2009-0016644

(51) Int. Cl.
*H01Q 1/24* (2006.01)
(52) U.S. Cl. ........................................ 343/702; 343/873
(58) Field of Classification Search .................. 343/702, 343/872, 873
See application file for complete search history.

(56) References Cited

U.S. PATENT DOCUMENTS

| 5,648,788 | A  | * | 7/1997  | Bumsted ........................ 343/895 |
|-----------|----|---|---------|----------------------------------------|
| 6,396,444 | B1 |   | 5/2002  | Goward et al.                          |
| 6,639,557 | B2 | * | 10/2003 | Kamei et al. ............ 343/700 MS    |
| 6,975,273 | B1 | * | 12/2005 | Choi .............................. 343/702 |
| 2001/0054780 | A1 |   | 12/2001 | Ogura                                |
| 2002/0093457 | A1 |   | 7/2002  | Hamada et al.                        |
| 2007/0216580 | A1 |   | 9/2007  | Lin et al.                           |
| 2007/0216583 | A1 |   | 9/2007  | Hou                                  |
| 2008/0067715 | A1 |   | 3/2008  | Sung                                 |
| 2008/0129638 | A1 |   | 6/2008  | Ong                                  |

(Continued)

FOREIGN PATENT DOCUMENTS

CN            201038311           3/2008

(Continued)

OTHER PUBLICATIONS

German Office Action for German Patent Application No. 102009046679.7, issued Sep. 29, 2011.

(Continued)

*Primary Examiner* — Tho G Phan
(74) *Attorney, Agent, or Firm* — Lowe, Hauptman, Ham & Berner, LLP

(57) ABSTRACT

A method of manufacturing an antenna-embedded case for a mobile communications terminal includes providing an antenna pattern, forming a first injection-molded member covering one surface of the antenna pattern, and disposing the first injection-molded member, provided with the antenna pattern on one surface thereof, in a second mold with the antenna pattern disposed in a space inside the second mold, and injection-molding a second injection-molded member covering the other surface of the antenna pattern to embed the antenna pattern between the first injection-molded member and the second injection-molded member.

10 Claims, 4 Drawing Sheets

U.S. PATENT DOCUMENTS

| | | |
|---|---|---|
| 2008/0247538 A1 | 10/2008 | Wu |
| 2009/0015490 A1 | 1/2009 | Honda et al. |
| 2009/0015507 A1 | 1/2009 | Hong et al. |
| 2009/0051616 A1 | 2/2009 | Hong et al. |
| 2009/0053439 A1 | 2/2009 | Sung et al. |
| 2010/0271265 A1 | 10/2010 | Sung et al. |
| 2010/0271270 A1 | 10/2010 | Sung et al. |
| 2010/0271272 A1 | 10/2010 | Sung et al. |
| 2010/0271283 A1 | 10/2010 | Sung et al. |
| 2011/0032153 A1 | 2/2011 | Hong et al. |

FOREIGN PATENT DOCUMENTS

| | | |
|---|---|---|
| DE | 102007043409 A1 | 3/2008 |
| DE | 202007016670 U1 | 3/2008 |
| DE | 102008031934 A1 | 1/2009 |
| DE | 102008039059 A1 | 2/2009 |
| DE | 102009046936 | 11/2010 |
| DE | 102009055289 | 11/2010 |
| DE | 102009055359 | 11/2010 |
| DE | 102009055361 | 11/2010 |
| DE | 102009055204 | 2/2011 |
| JP | 2000183626 A | 6/2000 |
| JP | 2002280821 A | 9/2002 |
| JP | 2008148122 | 6/2008 |
| JP | 2009-021932 A | 1/2009 |
| KR | 1020070044140 A | 4/2007 |
| KR | 1020080004656 A | 1/2008 |
| KR | 1020090006336 A | 1/2009 |
| WO | 2008123191 A1 | 10/2008 |

OTHER PUBLICATIONS

JP Office Action dated Nov. 22, 2011 in JP Application No. 2010-042595.
German Office Action for Application No. 10 2009 046 679.7 dated Apr. 16, 2012.
Japanese Office Action for Application No. 2010-042595 mailed Jun. 26, 2012.
Chinese Office Action for Application No. 200910221717.8 mailed May 23, 2012.

* cited by examiner

ANTENNA-EMBEDDED CASE FOR MOBILE COMMUNICATIONS TERMINAL, METHOD OF MANUFACTURING THE SAME, AND MOBILE COMMUNICATIONS TERMINAL

CROSS-REFERENCE TO RELATED APPLICATIONS

This application claims the priority of Korean Patent Application No. 10-2009-0016644 filed on Feb. 27, 2009, in the Korean Intellectual Property Office, the disclosure of which is incorporated herein by reference.

BACKGROUND OF THE INVENTION

1. Field of the Invention

The present invention relates to an antenna-embedded case for a mobile communications terminal, a method of manufacturing the same and a mobile communications terminal, and more particularly, to an antenna embedded case for a mobile communications terminal, which is formed through two injection processes, a method of manufacturing the same, and a mobile communications terminal.

2. Description of the Related Art

Mobile communications terminals, such as cellular phones, personal digital assistants (PDAs) and notebook computers, are increasingly playing an important role in modern society. Recently, terminals with a variety of functions and designs have emerged due to the fast growing market for portable wireless terminals that separately or commonly use multiple bands, such as CDMA, PDA, DCS and GSM. In addition, the terminals are required to be further diversified in function while becoming smaller, slimmer and lighter. Therefore, techniques for reducing terminal volume while retaining antenna functions are currently in the spotlight.

As for antenna devices, rod antennas or helical antennas that protrude outside terminals are advantageous in terms of their omnidirectional radiation; however, they are susceptible to damage when dropped, thereby undermining device portability. Therefore, studies are being conducted on in-mold antennas that are integrated with cases for mobile communications terminals.

SUMMARY OF THE INVENTION

An aspect of the present invention provides a structure for embedding an antenna into a case for a mobile communications terminal, and a method thereof.

According to an aspect of the present invention, there is provided a method of manufacturing an antenna-embedded case for a mobile communications terminal, the method including: providing an antenna pattern; forming a first injection-molded member covering one surface of the antenna pattern; and disposing the first injection-molded member, provided with the antenna pattern on one surface thereof, in a second mold with the antenna pattern disposed in a space inside the second mold, and injection-molding a second injection-molded member covering the other surface of the antenna pattern to embed the antenna pattern between the first injection-molded member and the second injection-molded member.

The antenna pattern may be formed into a flat type, and include an interconnection pin extending from one surface of the antenna pattern.

In the forming of the first injection-molded member, injection-molding may be performed such that an open end of the interconnection pin may be exposed to an opposite surface to a surface of the first injection-molded member contacting the antenna pattern.

The method may further include processing the antenna pattern into a structure having a three-dimensional shape, before the forming of the first injection-molded member.

The forming of the first injection-molded member may include: inserting the antenna pattern in a first mold having an internal space having a shape of the first injection-molded member; and injecting a molding material into the first mold and molding the first injection-molded member covering one surface of the antenna pattern.

According to another aspect of the present invention, there is provided a mobile communications terminal manufactured according to the method of manufacturing an antenna-embedded case for a mobile communications terminal.

According to another aspect of the present invention, there is provided an antenna-embedded case for a mobile communications terminal, including: an antenna pattern; a first injection-molded member covering one surface of the antenna pattern; and a second injection-molded member injection-molded to cover the other surface of the antenna pattern such that the antenna pattern is embedded between the first injection-molded member and the second injection-molded member.

The antenna pattern may be formed into a flat type, and include an interconnection pin extending from one surface of the antenna pattern and having one end exposed to a surface of the first injection-molded member.

The first injection-molded member and the second injection-molded member may be formed of different materials. The first injection-molded member may include a material for shielding electromagnetic waves.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1A:
FIGS. 1A through 1C illustrate a method of manufacturing an antenna-embedded case for a mobile communications terminal, according to an exemplary embodiment of the present invention.
Figure 1B:
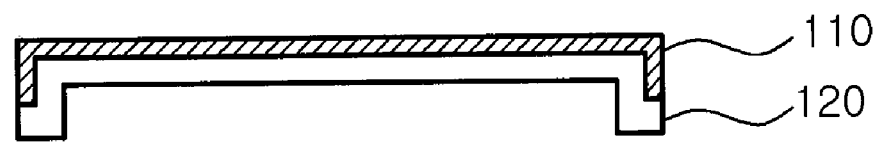
Figure 1C:
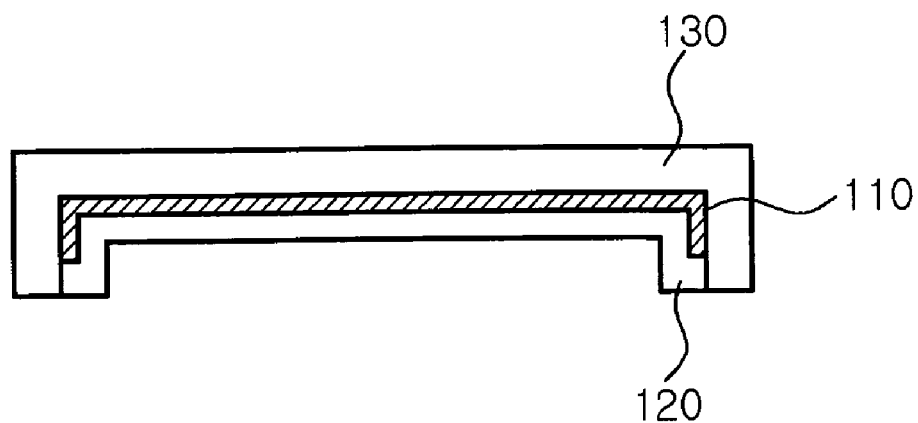

FIGS. 1A through 1C illustrate a method of manufacturing an antenna-embedded case for a mobile communications terminal according to an exemplary embodiment of the present invention.

Referring to FIGS. 1A through 1C, the process of manufacturing an antenna-embedded case for a mobile communications terminal, according to this embodiment, includes forming an antenna pattern (FIG. 1A), forming a first injection-molded member (FIG. 1B), and forming a second injection-molded member (FIG. 10).

The forming of the antenna pattern (FIG. 1A) may be the process of forming an antenna pattern 110 into a form suitable for a frequency used by a mobile communications terminal. According to this embodiment, the antenna pattern 110 may be a flat antenna pattern.

The antenna pattern 110 may be formed by performing press-processing on a metallic plate. A variety of materials may be used for the antenna pattern 110. The antenna pattern 110 may be a metallic plate having flexibility.

According to this embodiment, the forming of an antenna pattern 110 may include processing the antenna pattern into a three-dimensional shape. Thus, a case for a mobile communications terminal, in which the antenna pattern 110 is embedded, may have a three-dimensional shape. That is, processing an antenna pattern in advance according to the shape of the case may contribute to reducing unnecessary processes in the subsequent process of forming the case for a mobile communications terminal using an injection-molding process. Furthermore, by utilizing the shape of the case to a maximum extent, the radiation area of the antenna can be increased.

The forming of the first injection-molded member (FIG. 1B) may be the process of forming a first injection-molded member 120 covering one surface of the antenna pattern 110.

In this process, the first injection-molded member 120 may be formed by an in-molding process. That is, the first injection-molded member 120 may be manufactured by inserting the antenna pattern 110 into a mold for the production of the first injection-molded member 120, and injecting a synthetic resin into the mold. According to this embodiment, the first injection-molded member 120 may become the interior of a case for a mobile communications terminal.

The forming of the second injection-molded member (FIG. 1C) may be the process of forming a second injection-molded member 130 covering the other surface of the antenna pattern 110.

In this process, the second injection-molded member 130 may be formed by an in-molding process. That is, the second injection-molded member 130 may be manufactured by inserting the first injection-molded member 120 to which the antenna pattern 110 is attached into a mold for the production of the second injection-molded member 130, and injecting a synthetic resin into the mold. According to this embodiment, the second injection-molded member 130 may become the exterior of the case for a mobile communications terminal.

In the method of manufacturing an antenna-embedded case for a mobile communications terminal according to this embodiment, the processes of forming the first and second injection-molded members 120 and 130 may be performed separately in order to embed the antenna in the case. During the process of forming the first injection-molded member 120, the antenna pattern 110 is attached to the one surface of the first injection-molded member 120, thereby preventing the movement of the antenna pattern 110 in the injection-molding process. In addition, since the first injection-molded member 120 is formed after processing the antenna pattern into a three-dimensional structure, the radiation area of the antenna pattern 110 can be utilized to a maximum extent according to the shape of the first injection-molded member.

Figure 2A:
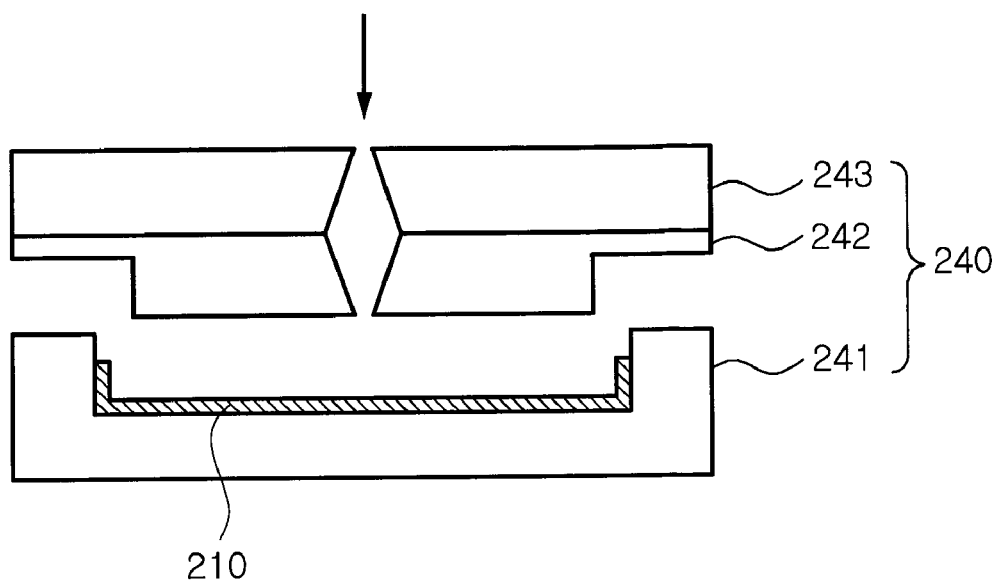
FIGS. 2A and 2B illustrate the structure of a mold used for a method of manufacturing an antenna-embedded case for a mobile communications terminal, according to another exemplary embodiment of the present invention.
Figure 2B:
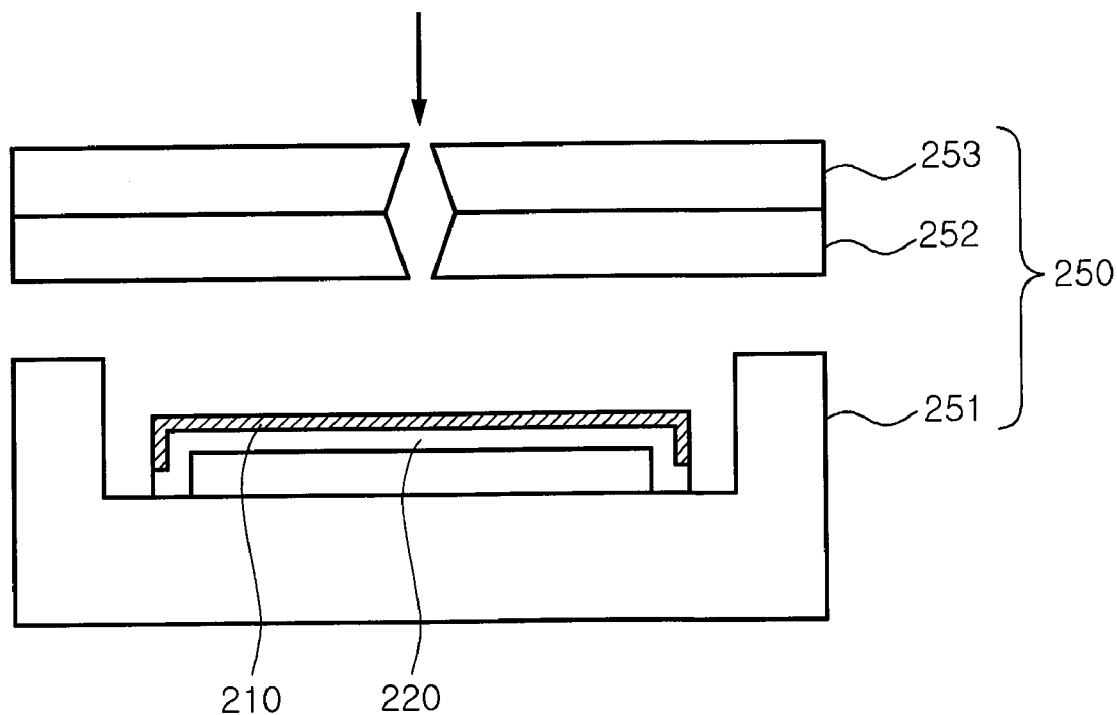

FIGS. 2A and 2B illustrate the structure of a mold used for the method of manufacturing an antenna-embedded case for a mobile communications terminal, according to another exemplary embodiment of the present invention.

FIG. 2A is a cross-sectional view illustrating a first mold 240 capable of forming a first injection-molded member for a case for a mobile communications terminal according to this embodiment.

The first mold 240 may include a first part 241 contacting an antenna pattern 210 and constituting the lower part of the first mold 240, a second part 242 through which a molding material is injected, the second part constituting the upper part of the first mold 240, and a third part 243 connected to a molding-material storage unit through a nozzle.

First, in the process of forming of the first injection-molded member, the antenna pattern 210 may be inserted into the first part 241 of the first mold 240. The interior of the first part 241 of the first mold 240 may have a shape corresponding to the first injection-molded member. The antenna pattern 210 may be processed in accordance with the interior shape of the first part 241 and then be inserted into the first part 241.

All the parts 241, 242 and 243 of the first mold 240 are joined together, and a molding material is then injected with constant pressure into a space between the first part 241 and the second part 242 of the first mold 240. The molding material may be a polymer-based material for forming a terminal case. After the space between the second part 242 and the first part 241 is filled with the molding material injected into the first mold 240, the first mold 240 may be maintained under constant pressure.

The molding material injected into the first mold 240 is cooled down and cured (hardened), and is then separated from the first mold 240, thereby forming the first injection-molded member having the antenna pattern 210 attached on its one surface.

FIG. 2B is a cross-sectional view illustrating a second mold 250 capable of forming a second injection-molded member for a case for a mobile communications terminal according to this embodiment.

The second mold 250 may include a first part 251 on which the first injection-molded member 220 mounted with the antenna pattern 210 is placed, the first part 251 constituting the lower part of the second mold 250, a second part 252 through which a molding material is injected, the second part 252 constituting the upper part of the second mold 250, and a third part 253 connected to a molding-material storage unit through a nozzle.

In the process of forming the second injection-molded member, the first injection-molded member 220 to which the antenna pattern 210 is attached may be inserted in the first part 251 of the second mold 250. Here, the first injection-molded member 220 mounted with the antenna pattern 210 may be placed in the first part 251 of the second mold 250, with the antenna pattern 210 facing upwards.

All the parts 251, 252 and 253 of the second mold 250 are joined together, and a molding material is then injected with constant pressure into a space between the first part 251 and the second part 252 of the second mold 250. The molding material may be a polymer-based material for forming a terminal case. After the space between the second part 252 and the first part 251 is filled with the molding material injected into the second mold 250, the second mold 250 may be maintained under constant pressure.

The molding material, injected into the second mold 250, is cooled down and then cured, and is then separated from the second mold 250, thereby forming a case for a mobile communications terminal, which has the antenna pattern 210 disposed between the first injection-molded member 220 and the second injection-molded member.

Figure 3A:
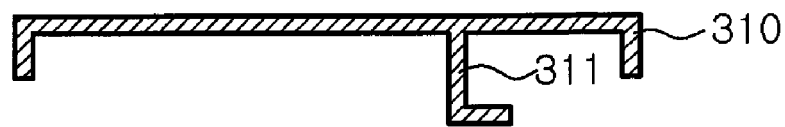
FIGS. 3A to 3C illustrate a method of manufacturing an antenna-embedded case for a mobile communications terminal, according to another exemplary embodiment of the present invention.
Figure 3B:
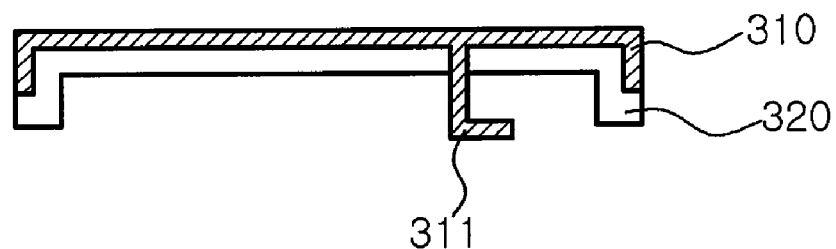
Figure 3C:
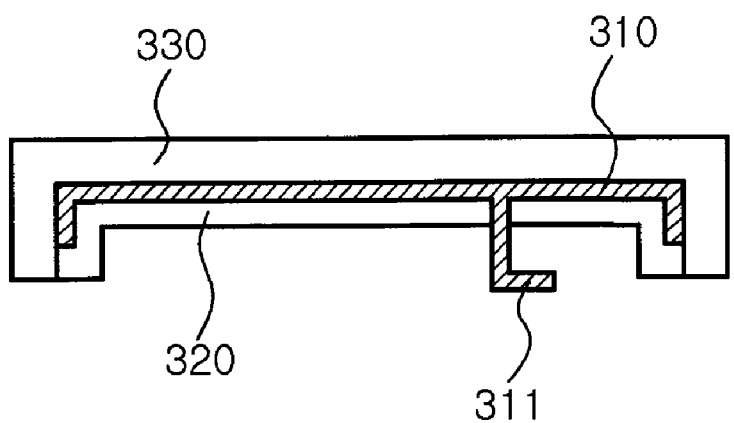

FIGS. 3A through 3C are views illustrating a method of manufacturing an antenna-embedded case for a mobile communications terminal according to another exemplary embodiment of the present invention.

Referring to FIG. 3A through 3C, the process of manufacturing an antenna-embedded case for a mobile communications terminal according to this embodiment, may include forming an antenna pattern (FIG. 3A), forming a first injection-molded member (FIG. 3B), and forming a second injection-molded member (FIG. 3C).

The forming of the antenna pattern (FIG. 3A) may be the process of forming an antenna pattern into a form suitable for a frequency used by a mobile communications terminal.

In this embodiment, the antenna pattern 310 may be a flat antenna pattern.

The antenna pattern 310 may be formed by performing press-processing on a metallic plate. Various materials may be used for the antenna pattern 310. The antenna pattern 310 may be a flexible metallic plate. In this embodiment, the antenna pattern 310 may include an interconnection pin 311 for an electrical connection with a circuit inside a mobile communications terminal. The interconnection pin 311 may extend from one surface of the antenna pattern 310.

According to this embodiment, the forming of the antenna pattern 310 may include processing the antenna pattern 310 into a three-dimensional shape. A case for a mobile communications terminal, in which the antenna pattern is embedded, may have a three-dimensional shape. Accordingly, processing an antenna pattern in advance according to the shape of the case may contribute to reducing unnecessary processes in the subsequent process of forming the case for a mobile communications terminal using an injection-molding process.

The forming of the first injection-molded member (FIG. 3B) may be the process of forming a first injection-molded member 320 covering one surface of the antenna pattern 310. The one surface of the antenna pattern 310 contacting the first injection-molded member 320 may be a surface from which the interconnection pin 311 extends.

In this process, the first injection-molded member 320 may be formed by an in-molding process. That is, the first injection-molded member 320 may be manufactured by inserting the antenna pattern 310 into a mold for producing the first injection-molded member 320, and injecting a synthetic resin into the mold. In this process, one open end of the interconnection pin 311 may be exposed to the surface of the first injection-molded member 320. The one end of the interconnection pin 311 exposed to the surface of the first injection-molded member 320 may contact a circuit of a board disposed inside a mobile communications terminal, thereby electrically connecting the antenna pattern 310 with the circuit.

The forming of the second injection-molded member (FIG. 3C) may be the process of forming a second injection-molded member 330 covering the other surface of the antenna pattern 310.

In this process, the second injection-molded member 330 may be formed by an in-molding process. That is, the second injection-molded member 330 may be manufactured by inserting the first injection-molded member 32, mounted with the antenna pattern 310, into a mold for producing the second injection-molded member 330, and injecting a synthetic resin into the mold. In this embodiment, the second injection-molded member 330 may become the exterior of a case for a mobile communications terminal.

In the method of manufacturing the antenna-embedded case for a mobile communications terminal according to this embodiment, the processes of forming the first and second injection-molded members 320 and 330 may be performed separately in order to embed an antenna into the case. In the process of forming the first injection-molded member 320, the antenna pattern 310 is attached to one surface of the first injection-molded member 320, thereby preventing the movement of the antenna pattern 310 during an injection-molding process. Also, since the first injection-molded member 320 is formed after processing the antenna pattern 310 into a three-dimensional shape, the radiation area of the antenna pattern 310 can be utilized to a maximum extent according to the shape of the first injection-molded member 320. Furthermore, since the interconnection pin 311 extending from the antenna pattern 310 is formed before the formation of the first injection-molded member 320, this may contribute to reducing additional processes or components used to connect the antenna pattern 310 with a circuit board mounted inside a terminal.

Figure 4:
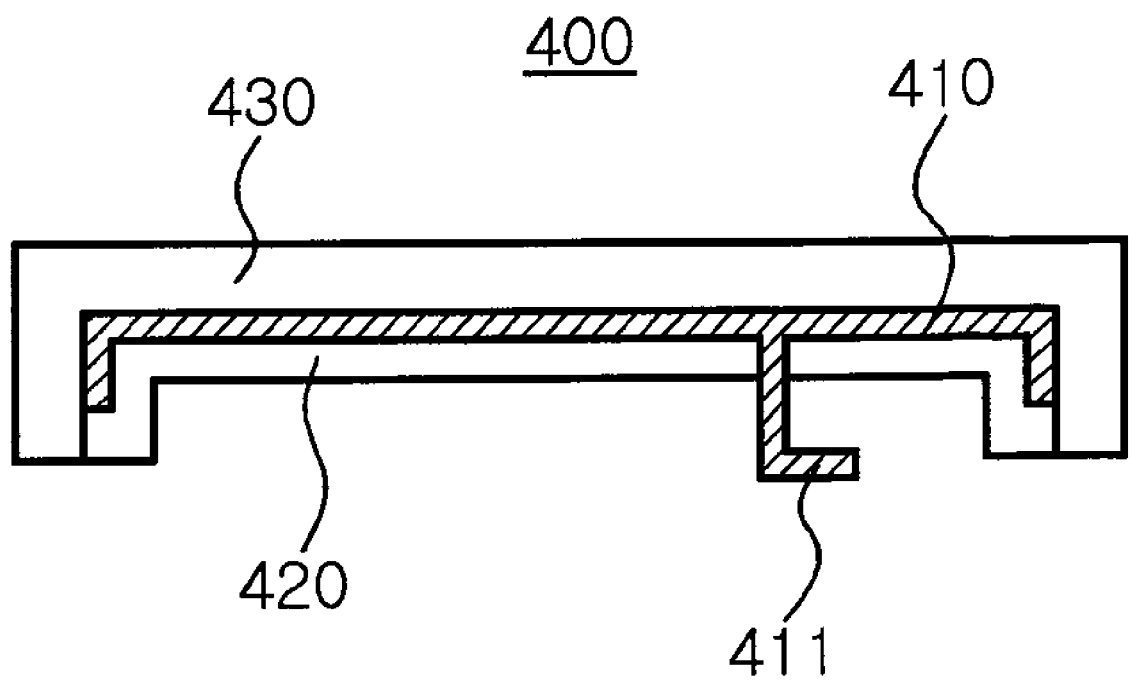
FIG. 4 is a cross-sectional view illustrating an antenna-embedded case for a mobile communications terminal according to another exemplary embodiment of the present invention.

FIG. 4 is a cross-sectional view illustrating an antenna-embedded case for a mobile communications terminal, according to another exemplary embodiment of the present invention.

An antenna-embedded case 400 for a mobile communications terminal may include a film-type antenna pattern 410, a first injection-molded member 420 and a second injection-molded member 430.

The film type antenna pattern 410 may be a flat antenna pattern. The antenna pattern 410 may be formed by performing press-processing on a metallic plate. Various materials may be used for the antenna pattern. The antenna pattern 410 may be a metallic plate with flexibility.

The first injection-molded member 420 may cover one surface of the antenna pattern 410. The first injection-molded member 420 may be formed of polymer-based material by using an in-molding process.

The second injection-molded member 430 may be formed on the first injection-molded member 420 so as to cover the other surface of the antenna pattern 410. The second injection-molded member 430 may be formed of a polymer-based material by using an in-molding process.

According to this embodiment, the antenna pattern 410 may further include an interconnection pin 411 extending from one surface of the antenna pattern 410. The interconnection pin 411 may extend from one surface of the antenna pattern 410. Since the interconnection pin 411 and the antenna pattern 410 are integrated together, an additional process for connecting the antenna pattern 410 with a circuit of a mobile communications terminal may not be performed after the antenna pattern 410 is embedded in the case.

According to this embodiment, the first injection-molded member 420 and the second injection-molded member 430 may be formed of differential materials. In this embodiment, the first injection-molded member 420 may constitute the interior of a case for a mobile communications terminal, and the second injection-molded member 430 may constitute the exterior of the case. The case for a mobile communications terminal may be a part of a completed mobile communications terminal. The interconnection pin 411 extending from the antenna pattern 410 may be connected to a board mounted inside the mobile communications terminal.

In terms of the inside of a terminal, the antenna pattern 410 needs to minimize interference with other components mounted inside a mobile communications terminal. In terms of the outside of the terminal, the antenna pattern 410 needs to maximize radiation characteristics. In this regard, the first injection-molded member 420 may contain a material that implements a characteristic that blocks electromagnetic waves generated from electronic components mounted inside the mobile communications terminal, thereby enhancing a shielding effect between the antenna pattern 410 and the internal electronic component. The second injection-molded member 430 may contain a material having a high dielectric constant, thereby enhancing the radiation effects of the antenna pattern 410.

As set forth above, according to exemplary embodiments of the invention, since an antenna can be embedded in a case for a mobile communications terminal, a case for a mobile communications terminal that is capable of satisfying requirements for both size reduction and antenna characteristics can be provided.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of manufacturing an antenna-embedded case for a mobile communications terminal, the method comprising:
   providing a three-dimensional metallic antenna pattern including first and second surfaces and an interconnection pin extending from the first surface;
   forming a first injection-molded member including first and second surfaces and covering the first surface of the antenna pattern from which the interconnection pin extends; and
   disposing the first injection-molded member, provided with the antenna pattern on the first surface thereof, in a second mold including a space with the antenna pattern disposed in the space, and injection-molding a second injection-molded member covering the second surface of the antenna pattern to embed the antenna pattern between the first injection-molded member and the second injection-molded member, wherein
   the interconnection pin and the antenna pattern are formed in an integrated manner.

2. The method of claim 1, wherein the antenna pattern excluding the interconnection pin is formed into a flat type.

3. The method of claim 2, wherein the forming comprises injection-molding the first injection-molded member such that an open end of the interconnection pin is exposed to the second surface of the first injection-molded member.

4. The method of claim 1, further comprising processing the antenna pattern into a structure having a three-dimensional shape, before the forming.

5. The method of claim 1, wherein the forming comprises:
   inserting the antenna pattern in a first mold including a space having a shape of the first injection-molded member; and
   injecting a molding material into the first mold and molding the first injection-molded member covering the first surface of the antenna pattern.

6. A mobile communications terminal comprising an antenna-embedded case manufactured according to the method of claim 1.

7. An antenna-embedded case for a mobile communications terminal, the antenna-embedded case comprising:
   a three-dimensional metallic antenna pattern including first and second surfaces and an interconnection pin extending from the first surface;
   a first injection-molded member including first and second surfaces and covering the first surface of the antenna pattern from which the interconnection pin extends; and
   a second injection-molded member injection-molded to cover the second surface of the antenna pattern such that the antenna pattern is embedded between the first injection-molded member and the second injection-molded member, wherein
   the interconnection pin and the antenna pattern are formed in an integrated manner.

8. The antenna-embedded case of claim 7, wherein the antenna pattern excluding the interconnection pin is formed into a flat type.

9. The antenna-embedded case of claim 7, wherein the first injection-molded member and the second injection-molded member are formed of different materials.

10. The antenna-embedded case of claim 9, wherein the first injection-molded member includes a material for shielding electromagnetic waves.

* * * * *